Nov. 19, 1968     M. AUGIER     3,411,190
MOULDING ATTACHMENT DEVICE FOR PINCH WELD JOINT
Filed Feb. 12, 1968
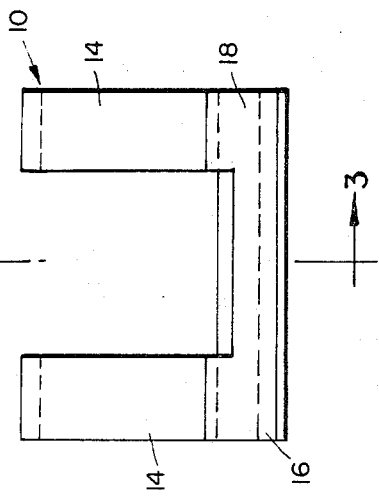
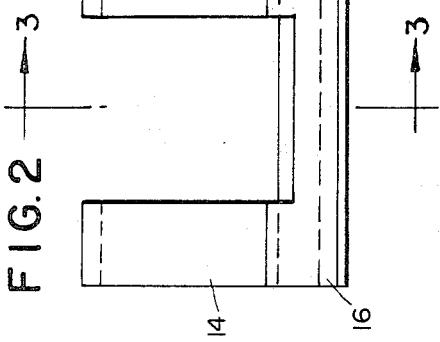
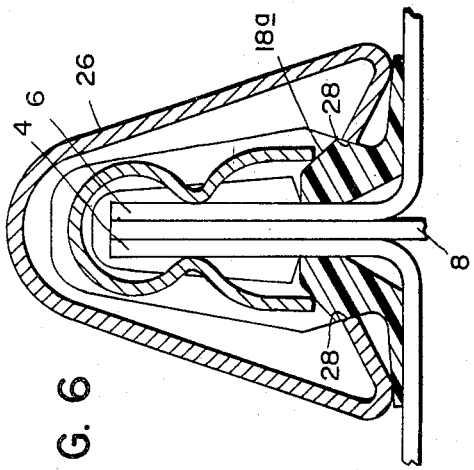
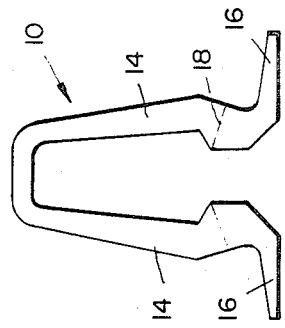
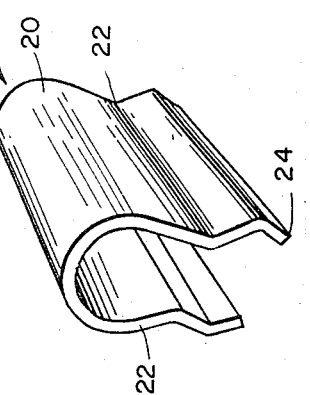
INVENTOR
MICHEL AUGIER
BY
Gordon Needleman
ATTORNEY United States Patent Office 3,411,190
Patented Nov. 19, 1968

3,411,190
MOULDING ATTACHMENT DEVICE FOR PINCH WELD JOINT
Michel Augier, Grenoble, France, assignor to A. Raymond, Grenoble, France, a firm
Filed Feb. 12, 1968, Ser. No. 704,864
Claims priority, application France, Mar. 16, 1967, 99,073
5 Claims. (Cl. 24—73)

ABSTRACT OF THE DISCLOSURE

This is a two-piece fastener device for engagement with a molding comprising a plastic staple-shaped fastener element which holds the molding from metal surfaces and a metal fastener clip element which is engaged with the staple-shaped fastener element to provide the means of holding the staple-shaped element to the support.

Background of the invention

In both the automotive industry and in the household appliance industry it is frequently necessary to assemble the unit by welding the edges of adjacent sheets, which have been bent at right angles, to form a pinch weld.

In order to conceal such unsightly and dangerous areas, the welds are covered with a V-shaped stripping generally made of aluminum or stainless steel. These profiling strips are often held in place by fasteners having barbs which are anchored in the sheet. Such fasteners, due to the barbs, tend to scratch protective coverings such as paints or enamels thereby providing areas which are subject to rust and providing channels where the moisture can easily accumulate. Rust, unsightly in itself, will ultimately deteriorate the support, thus loosening the fasteners, resulting in an unfastening of the strips or in the creation of areas that tend to make noise on movement.

Also, as is well known in the fastener art, the physical contact between the various metals which make up the fasteners, the sheets and the strips creates electric couples which, in turn, leads to dissimilar metal corrosion.

Summary of the invention

The present invention has as its object an attachment device or fastener which without requiring any piercing or scratching of the support, makes it possible to obtain the combined advantages of both a metal fastener and a plastic fastener. This device consists essentially of the combination of a staple-shaped fastener element, which could be made of a synthetic plastic material such as the polyamides, polyesters, polyolefins, etc. on which the strip can be fastened to the support by a snapping operation thus maintaining the staple in place on the support, and a metallic clamp.

It is desirable that the clamp be formed with a configuration which will avoid contact with the support except on arced surfaces in order to avoid scratching or damaging the paint on the support during installation. The staple provides a barrier which considerably reduces the risk of corrosion through scratches or the creation of areas of dissimilar metal corrosion.

The profile strips which also come into contact with the staples are held away from other metal surfaces thereby avoiding dissimilar metal corrosion.

Brief description of the drawings

FIG. 1 is an end elevation of the staple element.
FIG. 2 is a side elevation of the staple shown in FIG. 1.
FIG. 3 is a section taken on line 3—3 of FIG. 2.
FIG. 4 is a perspective of the clamp.
FIG. 5 is an end elevation of the support with the fastener shown in section and engaged with the support.
FIG. 6 is an end elevation of the support with the fastener and the strip engaged therewith; both the strip and fastener shown in section.

Description of the preferred embodiment

There is shown in the drawings a fastening device, designed to be placed on a pinch weld, comprising a staple element 10 and a flexible clamp 12. The pinch weld is formed by the right angle bend of two support sheets 4, 6 between which, if desired, one or more support sheets 8 can be sandwiched.

The staple 10 has two legs 14 formed at each end thereof. Each pair of legs 14 is connected by a bight portion and is spaced from the other pair of legs for the major portion of their length. The two pairs of legs 14 are connected at their ends by flanges 16 as shown in FIG. 2.

In other words, the central section of the staple 10 due to the spacing of the pairs of legs 14 has a notch formed therein whose lower surfaces are the upper surfaces of the flanges 16. These surfaces are inclined outwardly at some convenient angle in the range between 15 degrees and 50 degrees and will hereinafter be referred to as supporting surfaces 18. The supporting surfaces 18 can be substantially planar as shown in FIGS. 1 through 5 or may have the form of a dihedral or even curves as shown in FIG. 6 and designated by the number 18a. In order to hold the stripping 26 in place the staples 10 have at the juncture of each of the legs 14 with its respective flange 16 an oblique lateral notch 19 formed therein against which the terminal ends 28 of the strip 26 engage.

The clamp 12 is formed from a strip of flexible material, spring steel for example, bent back on itself to form a bight portion 20 with a pair of spaced, converging wall portions 22 extending therefrom. Each of the walls 22 is first bent inwardly then outwardly and angled back again as shown in FIGS. 4, 5 and 6.

The depth of the clamp 12 is such that when it is engaged with the support, the free terminal ends 24 of the wall portions 22 will bear on the supporting surfaces 18 of the staple 10 without the bight 20 of the clamp 12 touching any of the surfaces of the support 2. The clamp 12 may extend slightly beyond the height of the staple 10 as shown in FIG. 5 or may be less than that height as shown in FIG. 6.

To attach the fastening device to the support 2, the staple 10 is snapped over the pinch weld with a leg 14 on each side of the sandwich formed by the sheets 4, 6, 8 and with the flanges 16 in superposed abutting relationship with the upper surface of the sheets 4 and 6 as shown in FIGS. 5 and 6. The clamp 12 is then engaged with the staple 10 by inserting it in the slot formed between the legs 14 with its ends 24 bearing against the supporting surfaces 18. Finally, the strip 26 is snapped over the fastener assembly with its terminal ends butted against the flanges 16 and its terminal ends 28 engaged against the wall of the oblique lateral notches 19.

I claim:
1. A two-piece fastening device engageable with the extension of a support comprising a fastener element and a clamp, the fastener element having two U-shaped portions attaching a pair of spaced flanges together, the U-shaped portions spaced from each other defining a notch area, the upper surface of the flanges of the notch area being angled and a U-shaped clamp having free terminal edges adapted to engage the upper surfaces of the flanges and the clamp having arced means of engaging the extension of the support.
2. A two-piece fastening device as set forth in claim 1 wherein the fastener element is formed of an organic polymeric material and the length of the clamp is less than the length of the notch area.

3. A two-piece fastening device as set forth in claim 2 wherein the clamp has a pair of spaced wall portions connected at an edge of each to provide the said U-shaped configuration and wherein each wall portion has an inwardly extending arced bend providing the means of engaging the extension of the support.

4. A two-piece fastening for a pinch weld comprising a fastener element and a clamp, the fastener element having a pair of spaced flanges, each of the flanges having a leg extending therefrom adjacent each terminal end thereby providing two pair of opposed legs, each pair of legs connected together, the pairs of opposed legs spaced from each other to provide a notch area therebetween, the notch area having a portion of the upper surface of each flange as part of its floor, each of the upper surfaces being in angular relation to the longitudinal mid plane of the fastener element and the clamp formed of a flexible metal and having a pair of spaced wall portions connected at an edge to define a U-shaped configuration, each of the wall portions having a longitudinal portion bent inwardly to provide a surface engaged with the pinch weld and having a free edge adapted to butt against the angled, upper surface of the flanges of the fastener element and the clamp having a length less than the length of the notch area of the fastener element.

5. The combination of a support, an article to be held and a two-piece fastening device, said fastening device comprising a fastener element and a clamp, the fastener element having a pair of spaced flanges, each of the flanges having a leg extending therefrom adjacent each terminal end thereby providing two pair of opposed legs, each pair of legs connected together, the pairs of opposed legs spaced from each other to provide a notch area having a portion of the upper surface of each flange as part of its floor, each of the upper surfaces being in angular relation to the longitudinal mid plane of the fastener element and the clamp formed of a flexible metal and having a pair of spaced, converging wall portions connected at an edge to define a U-shaped configuration, each of the wall portions having an inwardly extending longitudinal bend and having a free edge and the clamp having a length less than the length of the notch area of the fastener element and the support comprising at least two support portions each having an end bent in angular relation to the remaining support and said bent portions in abutted relationship and the fastener element engaged on said support sandwiching the butted angled portions therebetween and the flanges in superposed abutting relation with the support and the clamp having its free ends in superposed abutting relationship with the upper surfaces of the fastener element and the longitudinal bends of the clamp butted against the butted angled portions of the support.

References Cited

UNITED STATES PATENTS

| | | | |
|---|---|---|---|
| 3,004,643 | 10/1961 | MacCallum | 24—73 |
| 3,037,595 | 6/1962 | Meyer | 24—73 |
| 3,197,935 | 8/1965 | Clancy et al. | 52—718 |

FOREIGN PATENTS

| | | |
|---|---|---|
| 1,407,821 | 6/1965 | France. |

DONALD A. GRIFFIN, *Primary Examiner.*